(12) United States Patent
Asaoka et al.

(10) Patent No.: US 7,666,916 B2
(45) Date of Patent: Feb. 23, 2010

(54) FLOCCULANT, MANUFACTURING METHOD THEREFOR, AND FLOCCULATION METHOD USING THE FLOCCULANT

(76) Inventors: Keiichiro Asaoka, 8-8, Izumi-cho, Atsugi-shi, Kanagawa, 243-0013 (JP); Hidetake Nerome, 76-3, Aza-Nakaima, Naha-shi, Okinawa, 902-0074 (JP)

( * ) Notice: Subject to any disclaimer, the term of this patent is extended or adjusted under 35 U.S.C. 154(b) by 290 days.

(21) Appl. No.: 10/565,786

(22) PCT Filed: Oct. 23, 2003

(86) PCT No.: PCT/JP03/13513

§ 371 (c)(1),
(2), (4) Date: Apr. 25, 2006

(87) PCT Pub. No.: WO2005/009586

PCT Pub. Date: Feb. 3, 2005

(65) Prior Publication Data
US 2006/0183808 A1   Aug. 17, 2006

(30) Foreign Application Priority Data
Jul. 25, 2003   (JP)   ............................ 2003-279531

(51) Int. Cl.
*C01B 33/141*  (2006.01)
*B01D 21/01*  (2006.01)
(52) U.S. Cl. ........................ 516/81; 516/113
(58) Field of Classification Search ............... 516/81
See application file for complete search history.

(56) References Cited

U.S. PATENT DOCUMENTS 2,650,193 A * 8/1953 Kalinske et al. ............ 210/718
3,876,442 A * 4/1975 Thomas ...................... 106/446
4,923,629 A * 5/1990 Hasegawa et al. ........... 252/181
5,888,711 A * 3/1999 Poncelet et al. ............. 430/527

FOREIGN PATENT DOCUMENTS

| JP | 3-157107 | | 7/1991 |
| JP | 03157107 A | * | 7/1991 |
| JP | 4-75796 | | 12/1992 |
| JP | 6-233904 | | 8/1994 |
| JP | 06233904 A | * | 8/1994 |
| JP | 2732067 | | 12/1997 |
| JP | 2759853 | | 3/1998 |
| JP | 11-057740 | | 3/1999 |
| JP | 2000-093705 | | 4/2000 |
| JP | 2001-104711 | * | 4/2001 |
| JP | 2001-322810 | | 11/2001 |
| JP | 2003-38908 | | 2/2003 |
| WO | WO0194265 A1 | * | 12/2001 |

OTHER PUBLICATIONS

Popovics, S., Concrete Materials—Properties, Specifications and Testing, 1992, Publisher: William Andrew Publishing/Noyes 2nd Ed., pp. 6 and 9.*

* cited by examiner

*Primary Examiner*—Ling-Siu Choi
*Assistant Examiner*—Chun-Cheng Wang
(74) *Attorney, Agent, or Firm*—Kirk A. Buhler; Buhler & Associates

(57) ABSTRACT

A flocculant, a manufacturing method therefor, and a flocculation method using the flocculant are provided such that a suspension of tap water treatment plant, sewage treatment plant, industrial drainage water or other service water or drainage water can be easily, safely, and quickly treated. A flocculant made from a silicon colloidal solution for gelation through dilution and flocculating suspended matter in conjunction with the gelation.

8 Claims, No Drawings ized and stabilized in a solution state with an electric potential. In order to make a silicon colloidal solution into a strong acid or strongly alkaline and maintain a solution state as with the flocculants mentioned in Patent Literature 1 to 4, there are the problems that concerns arise regarding the pH value of the water after processing, and that gelation due to neutralization of the silicon colloidal solution is inadequate, so the pH of the water needs to be adjusted.

FLOCCULANT, MANUFACTURING METHOD THEREFOR, AND FLOCCULATION METHOD USING THE FLOCCULANT

TECHNICAL FIELD

The present invention relates to a flocculant for flocculating suspended matter in a suspension, a manufacturing method therefor, and a flocculation method using the flocculant.

BACKGROUND ART

Conventionally, a water treatment method was carried out to remove suspended matter from various types of service water and draining water by added a flocculant to the water to cause flocculation and precipitation of the suspended matter. Polyacrylamide, aluminum sulfate, and the like have been used as flocculants for water treatment.

Such flocculants require pH adjustment during water treatment, and there are concerns not only about the complications in water treatment that arise, but about the safety of the water after treatment. Further, there was the problem that adequate flocculation effects are not obtained with aluminum sulfate when the temperature of the water to be processed is low.

A variety of flocculants comprising a silicon-colloidal solution in which silicon is dissolved are known that are non-toxic and safe and have high flocculation effects that can solve these problems (refer to Patent Literature 1 to 4).

(Patent Literature 1) Unexamined Patent Application Number 20003-38908 (Japan).

(Patent Literature 2) Patent Number 2759853 (Japan).

(Patent Literature 3) Patent Number 2732067 (Japan).

(Patent Literature 4) Published Examined Patent Application H4-75796 (Japan).

With a silicon colloidal solution, however, it is difficult to maintain a stable solution state for a long time; sodium silicate ($H_4SiO_4$), a general silicon solution, needs to be made alkaline and stabilized in a solution state with an electric potential. In order to make a silicon colloidal solution into a strong acid or strongly alkaline and maintain a solution state as with the flocculants mentioned in Patent Literature 1 to 4, there are the problems that concerns arise regarding the pH value of the water after processing, and that gelation due to neutralization of the silicon colloidal solution is inadequate, so the pH of the water needs to be adjusted.

DISCLOSURE OF INVENTION

In order to solve the above-mentioned problems, the present invention provides a flocculant made from a silicon colloidal solution that is gelated through dilution and that thereby flocculates suspended matter.

The present invention provides a flocculant wherein the above-mentioned silicon colloidal solution is made by dissolving a silicon-containing substance provided with acid solubility by mixing a silicon-containing substance with an alkaline substance and heat treating the result at a temperature below the melting temperature of the silicon-containing substance in an acid solvent.

Also, the present invention provides the flocculant mentioned in claim 2, wherein the above-mentioned alkaline substance is made from calcium carbonate or lime.

Also, the present invention provides flocculants, wherein the above-mentioned acid solvent is made from diluted hydrochloric acid.

Also, the present invention provides the flocculants wherein the above-mentioned acid solvent contains one, two, or more gelation suppressants selected from an acetic acid, ammonium acetate, and ammonium chloride group.

Also the present invention provides flocculants wherein the above-mentioned silicon-containing substance contains iron or aluminum.

Also, the present invention provides the flocculants having a wherein pH value between 2 and 3.

Also, the present invention provides a manufacturing method for a flocculant comprising a silicon-containing substance generation means for mixing a silicon-containing substance and an alkaline substance and heat treating the result at a temperature lower than the melting temperature of said silicon-containing substance to generate an acid soluble silicon-containing substance, an acid solvent generation means for generating a solvent made from an acid solution, and a silicon colloidal solution generation means for dissolving the above-mentioned silicon-containing substance in the above-mentioned acid solvent to generate a silicon colloidal solution.

Also, the present invention provides the manufacturing method for a flocculant mentioned above, wherein the above-mentioned alkaline substance is made from calcium carbonate or lime.

Also, the present invention provides the manufacturing methods for a flocculant, wherein the above-mentioned acid solvent generation means comprises a means for diluting hydrochloric acid to generate an acid solvent.

Also, the present invention provides manufacturing methods for a flocculant, wherein the above-mentioned acid solvent generation means includes a means for mixing 1, 2, or more gelation suppressants selected from an acetic acid, ammonium acetate, and ammonium chloride group with the above-mentioned acid solution.

Also, the present invention provides the manufacturing methods for a flocculant, wherein a filtering means is added for filtering the above-mentioned silicon colloidal solution to remove undissolved suspended matter.

Also, the present invention provides manufacturing methods for a flocculant, wherein an aggregating means is added for adding gypsum to the above-mentioned silicon colloidal solution to aggregate undissolved suspended matter.

Also, the present invention provides manufacturing methods for a flocculant, wherein a pH value adjustment means is added for adding iron or aluminum to the above-mentioned silicon colloidal solution to adjust the pH value thereof.

Also, the present invention provides a flocculation method using the flocculants of the present invention, wherein the flocculant is mixed in a suspension to flocculate suspended matter.

Also, the present invention provides the flocculation method just mentioned, wherein a means is added to further mix an alkaline substance in the suspension.

BEST MODE FOR CARRYING OUT THE INVENTION

The flocculant according to the present invention is made from a silicon colloidal solution that gelates due to dilution and flocculates suspended matter thereby, and the silicon colloidal solution is made by dissolving a silicon-containing substance provided with acid solubility by mixing a silicon-containing substance with an alkaline substance, and heat treating the result at a temperature lower than the melting point of the silicon-containing substance in an acid solvent.

The silicon-containing substance is made from a natural earth containing silicon dioxide ($SiO_2$) or some other silicon compound, a rock, or a processed product containing such. The silicon-containing substance preferably contains iron or aluminum. As shown in Table 1, the content ratio of silicon dioxide is high, and the use of Inbu white clay (an earth from the Inbu region of Okinawa Prefecture) containing iron oxide ($FeO_3$) or aluminum oxide ($Al_2O_3$) is preferable. The silicon-containing substance contains iron or aluminum, so ultra-fine particles and color pigments (0.01 μm or smaller) not captured with an ordinary flocculant are picked up through a reduction effect of the minute quantity of iron or aluminum dissolved simultaneously with the silicon solution, and are then flocculated and aggregated.

An ordinary cement that may be easily obtained may also be used as the silicon-containing substance.

TABLE 1

| Constituent (%) | $SiO_2$ | $Al_2O_3$ | $FeO_3$ | $TiO_2$ | CaO | MgO | $K_2O$ | $Na_2O$ |
|---|---|---|---|---|---|---|---|---|
| Inbu white clay | 72.5 | 16.9 | 0.39 | 0.31 | 0.83 | 0.22 | 2.74 | 1.81 |
| Ordinary cement | 22.4 | 4.9 | 2.9 | — | 64.8 | 1.4 | — | — |

An alkaline substance is used to alter the silicon-containing substance so it has acidic solubility, and when calcium carbonate ($CaCO_3$) or lime is mixed as an alkaline substance with the silicon-containing substance and the result is heat treated, the generated silicon-containing solute is a powder, increasing the solubility in an acid solvent.

When the heat treatment is carried out at a temperature at or above the melting point of the silicon-containing substance, the result is a glass form with low solubility, so heat treatment is carried out at an arbitrary temperature below the melting point of the silicon-containing substance. When the silicon-containing substance is Inbu white clay, an arbitrary temperature below approximately 1300° C., the melting point of Inbu white clay, may be used, and heat treatment at 1150 to 1250° C., close to the melting point, is preferable. The temperature for suitable heat treatment differs depending on the silicon-containing substance.

A variety of acid solutions such as hydrochloric acid and sulfuric acid can be used for the acid solvent. If the above-mentioned alkaline substance is calcium carbonate, it is favorable to use hydrochloric acid as the acid solvent because calcium is highly soluble in hydrochloric acid, and the result becomes safe, non-toxic calcium chloride ($CaCl_2$) when neutralized. Because the solubility of silicon is fixed for a given acid concentration, and the density of a silicon colloidal solution dispersed in a given fluid volume cannot maintain a stable solution state except in a fixed water gaps, it is favorable to use diluted hydrochloric acid where hydrochloric acid is diluted as an acid solvent, and, it is particularly preferable to use diluted hydrochloric acid diluted 3 to 7 times. If the acid concentration of the acid solvent is high, the silicon will dissolve quickly, but gelation occurs more readily because the stability density of the solution cannot be maintained.

The acid solvent favorably contains one, two or more gelation suppressants selected from acetic acid ($C_2H_4O_2$), ammonium acetate ($CH_3COONH_4$), and ammonium chloride $NH_4Cl_3$. Using acetic acid as a gelation suppressant adjusts the quantity of liquid acetic acid added by drops due to the pH buffer action of the acetic acid and the astringency of the solution and colloid, allowing gelation of the silicon colloidal solution to be suppressed. Adding ammonium acetate or ammonium chloride to the diluted hydrochloric acid for a mixed acid also suppresses gelation of the silicon colloidal solution, similar to the acetic acid.

The pH value of the flocculant according to the present invention is favorably adjusted to between 2 and 3. The stronger the acidity of the flocculant, the more the effect on flocculation, and it is favorable to adjust the pH of the flocculant between 2 and 3 because pH adjustment is required for turbid water when the water contains acidic soil particularly one such as red earth. It is favorable to adjust the pH of the flocculant to 3 or less based on the experimental confirmation of gelation of the silicon colloidal solution at a pH of 3 and because iron and aluminum reduction occurs at a pH of 4 and above.

The flocculant can be added to a suspension, and the result mixed, thereby increasing the pH of the silicon colloidal solution to 3 or higher so the solution gelates, flocculation of the suspended matter occurs. The suspension after adding a flocculant has a flocculation reaction at a pH of 4 and higher, and at a safe water standard of a pH between 6 and 8, flocculation is greater, stronger, and heavier, providing the best effects.

If the suspension is an acidic water, similar flocculation is effected by neutralizing it in sodium hydroxide (NaOH), calcium carbonate ($CaCO_3$), lime, or some other alkaline substance. If the turbid water contains alkaline soil or organic matter, the acid is neutralized by the flocculant, so the pH does not need to be adjusted.

If the suspension to be treated contains organic matter or if it has a low concentration, a means can be added to further mix calcium carbonate in the suspension, causing flocculation of the light flocculant required time for precipitation to occur using the calcium carbonate as the core, so that precipitation occurs in a short time.

Next, the manufacturing method of the above-mentioned flocculant is described based on an example of embodiment.

The manufacturing method of the flocculant according to the present invention comprises a silicon-containing substance generation means for mixing a silicon-containing substance and an alkaline substance, and heat treating the result at a temperature below the melting point of the silicon-containing substance to produce an acid-soluble silicon-containing substance; an acid solvent generation means for generating a solvent made from an acid solution; and a silicon colloidal solution generation means for dissolving the above-mentioned silicon-containing substance in the above-mentioned acid solvent to generate a silicon colloidal solution.

(Example of Embodiment 1)

In this example of embodiment, Inbu white clay, a natural substance with a high silicon dioxide ($SiO_2$) and aluminum oxide ($Al_2O_3$) content was used as the silicon-containing substance, and calcium carbonate ($CaCO_3$) was used as the alkaline substance.

(Silicon-Containing Substance Generation Means)

First, the Inbu white clay was dried, then pulverized to about 200 mesh. Next, Chichibu limestone, the main constituent in the calcium carbonate, was also pulverized to about 200 mesh. The pulverized Inbu white clay and Chichibu limestone were mixed to consistency at a ratio of 3:7 by mass, and the result baked in an electric oven at 1229° C. until it became a powder. When the Inbu white clay and the Chichibu limestone mixture is baked, a portion of the result becomes lumpy, and expansion effects of the calcium accompanying cooling cause natural crumbling, forming a white powder silicon-containing substance.

(Acid Solvent Generation Means)

An acid solvent generation means comprises a means for diluting hydrochloric acid to generate an acid solvent; hydrochloric acid (HCl) with a concentration of 33% is diluted five time, making a diluted hydrochloric acid with a 6.6% concentration.

The acid solvent generation means has a means for mixing one, two or more gelation suppressants selected from an acetic acid, ammonium acetate, and ammonium chloride group with the above-mentioned acid solution; in the present example of embodiment, 25 cc of 99-percent concentrate acetic acid is added by drops as a gelation suppressant to 1 liter of 6.6 percent concentrate diluted hydrochloric acid, and the result is agitated to generate an acid solvent. When silicon is dissolved in an acid mixture in which acetic acid is added to diluted hydrochloric acid, a solution state can be maintained stably for a long period.

(Silicon Colloidal Solution Generation Method)

85 g of silicon-containing substance is added to 1 liter of acid solvent, and this is dissolved by agitation in a stirrer for 12 hours. When a silicon-containing substance is added to an acid solvent, the reaction heat causes a rise to 39° C., and after 5 hours, the powdered solute suspension stops changing and the solution becomes saturated, resulting in a silicon colloidal solution saturated solution. The result is then cooled while being agitated without further modification, bringing the temperature down over 7 hours until it is the same as room temperature, and the solution reaction is judged as being complete. No particles can be seen in the solution, which is a golden yellow suspension.

In the present example of embodiment, a filtering means for filtering the silicon colloidal solution to remove the undissolved suspended matter, and an aggregating means for adding gypsum to the silicon colloidal solution to aggregate the undissolved suspended matter are added, and the undissolved suspended matter in the silicon colloidal solution is filtered.

For easy filtering, 10 g of gypsum ($CaSO_4$) is added to the silicon colloidal solution, this is agitated and mixed for approximately 20 minutes (the time for a solidification reaction of the gypsum), and the undissolved particulates are captured to cause aggregation. Next, when a drip coffee paper filter is used to filter the silicon colloidal solution, a yellow, transparent acidic silicon colloidal solution saturated solution with a pH of 1.8 is obtained, and after approximately 2 hours of filtering, the liquid cannot be discerned in the paper filter. If filtering is carried out without mixing in gypsum, it is not possible to filter completely even after 24 hours, and liquid is left in the paper filter.

The reason for mixing gypsum in the silicon colloidal solution is because the increase in filtration has an effect such that the gypsum has a solidifying capacity in acidic solution; undissolved particulates that cause clogging in the filter are captured and caused to aggregate, creating a gap for water passage; and the gypsum has affects the pH of the flocculant.

Also, a pH value adjustment means adds iron or aluminum to the silicon colloidal solution, adjusting the silicon colloidal solution pH value. 100 g of iron nails are inserted in the above-mentioned acid silicon colloidal solution saturated solution that is yellow and transparent with a pH of 1.8, and this is ended when the pH becomes 2.6 after approximately 10 hours, and the result is filtered. The amount of iron solution in the silicon colloidal solution is minute, so only a small amount of iron nails is fine, but a larger amount may be inserted to increase the reaction time. After treatment, the liquid becomes a near-colorless faint yellow color, transparent with a pH of 2.6. To make the pH adjustment, hydrogen was generated in a chlorine reaction with iron, and bivalent iron ions ($Fe^{2+}$) were generated, at which time the chlorine (Cl) in the hydrochloric acid (HCl) was consumed, raising the pH value. A similar effect is produced by injected aluminum instead of the iron nails, though iron, with its high safety, was used for this example of embodiment.

The acid saturated solution of silicon colloidal solution obtained in the process described above was used to carry out a flocculation experiment of suspended matter in an inorganic suspension and an organic suspension.

TABLE 2

| Sample | Sample turbidity (ppm) | Flocculant additive quantity (cc) | Agitation time (min) | Rest time (min) | Precipitated flocculation quantity (%) | Supernatant turbidity (ppm) |
|---|---|---|---|---|---|---|
| 1 | 20,000 | 2.0 | 3 | 10 | 40 | 20 or less |
| 2 | 10,000 | 1.0 | 2 | 10 | 30 | 20 or less |
| 3 | 5,000 | 1.0 | 1 | 5 | 20 | 20 or less |
| 4 | 2,500 | 1.0 | 1 | 5 | 14 | 20 or less |
| 5 | 1,250 | 1.0 | 1 | 5 | 10 | 20 or less |
| 6 | 625 | 0.5 | 1 | 5 | 7 | 20 or less |
| 7 | 312 | 0.5 | 1 | 5 | 5 | 20 or less |
| 8 | 156 | 0.5 | 1 | 5 | 3 | 20 or less |
| 9 | 78 | 0.5 | 1 | 10 | 3 | 20 or less |
| 10 | 40 | 0.5 | 1 | 10 | 2 | 20 or less |
| 11 | 20 | 0.5 | 1 | 10 | 1 | 20 or less |

Table 2 shows the effects of the flocculation experiment using turbid water containing red earth (acidic dirt) as the inorganic suspension. The turbidity of the turbid water was adjusted to 20,000 ppm, and turbid water samples with the turbidity adjusted through dilution were prepared (Table 2, 1 to 11).

A 1-liter turbid water sample at each turbidity was placed in a beaker, the flocculant manufactured in the above-mentioned Example of Embodiment 1 was measured and dripped into the sample being agitated in a stirrer, the agitation was timed, and after the agitation time elapsed, the result was transferred to a graduated cylinder, ending the agitation. The rest time was measured, and after the rest time elapsed, the quantity of precipitated flocculant was measured in the graduated cylinder; the percentage amount as per the suspension quantity was found, the transparency (cm) of the supernatant was measured with a 30-cm transparency meter, and the turbidity (ppm) was converted using a conversion chart.

As shown in Table 2, the turbidity of the supernatant after flocculant treatment was 20 ppm or less for all of the turbid water samples. Accordingly, it is possible to flocculate suspended matter with a range of treatment for suspension concentrations from a high concentration (20,000 ppm) to a low concentration (20 ppm and less). When the suspension has a low concentration, however, the flocculant is small, so the rest time was extended to provide time for precipitation.

TABLE 3

| Sample | Sample turbidity (ppm) | Flocculant additive quantity (cc) | Agitation time (min) | Rest time (min) | Precipitated flocculation quantity (%) | Supernatant turbidity (ppm) |
|---|---|---|---|---|---|---|
| 1 | 700 | 1.0 | 1 | 5 | 5 | 20 or less |
| 2 | 350 | 0.5 | 1 | 5 | 5 | 20 or less |
| 3 | 170 | 0.3 | 1 | 5 | 3 | 20 or less |
| 4 | 87 | 0.3 | 1 | 5 | 1 | 20 or less |
| 5 | 43 | 0.3 | 1 | 5 | 1 or less | 20 or less |
| 6 | 20 | 0.3 | 1 | 5 | 1 or less | 20 or less |
| 7 | 700 | 1.5 | 1 | 10 | 2 | 20 or less |

TABLE 3-continued

| Sample turbidity (ppm) | Flocculant additive quantity (cc) | Agitation time (min) | Rest time (min) | Precipitated flocculation quantity (%) | Supernatant turbidity (ppm) |
|---|---|---|---|---|---|
| 8  350 | 1.0 | 1 | 10 | 2 or less | 20 or less |
| 9  170 | 0.5 | 1 | 10 | 2 or less | 20 or less |

Table 3 shows the results of the flocculation experiment using turbid water containing powdered blue-green algae as the organic suspension. Turbid water was sampled from a pond with blue-green algae, the turbidity of which was measured and found to be 700 ppm. Samples of the turbid water were prepared with the turbid water diluted to adjust the turbidity (Table 3, 1 to 9).

A 1-liter turbid water sample at each turbidity was placed in a beaker, which was agitated in a stirrer while adding 0.5 g of calcium carbonate as a weight and flocculant core to expedite precipitation of the flocculant. The flocculant manufactured in the above-mentioned Example of Embodiment 1 was weighed and added by dripping, the agitation was timed, and after the agitation time elapsed, the result was transferred to a graduated cylinder, ending the agitation. The rest time was measured, and after the rest time elapsed, the quantity of precipitated flocculant was measured in the graduated cylinder; the percentage amount as per the suspension quantity was found, the transparency (cm) of the supernatant was measured with a 30-cm transparency meter, and the turbidity (ppm) was converted using a conversion chart.

As shown in Table 3, the turbidity of the supernatant after flocculant treatment was 20 ppm or less for all of the turbid water samples. Accordingly, it is possible to flocculate suspended matter for organic suspensions from a high concentration (700 ppm) to a low concentration (20 ppm and less).

If calcium carbonate is not added to the turbid water, the aggregating flocculants are light and so float in the water without precipitating, but they are separate from the water, so filtering results in 20 ppm or less of turbidity.

Using only the flocculant according to the present invention, the effect described above can be obtained, but by combining it with another flocculation as a flocculation initiation agent in pre-treatment, a further high capacity is shown in small quantities.

TABLE 4

Analysis Experiment Results Chart
No. 2003-00535-A01

| Sample name | Source water | Treatment water | Drainage standard (uniform standard) |
|---|---|---|---|
| Date and time of sample | Aug. 17, 2003 | Aug. 18, 2003 | |
| Sample location | Livestock drainage water (untreated) Solid and liquid separation of feces and urine | Livestock drainage water (treatment water) | |
| Weather | — | — | |
| Air temp. Water temp. | — — | — — | |
| Hydrogen ion concentration PH | 7.1 | 7.2 | 5.8 to 8.6 (Sea drainage areas: 5.0 to 9.0) |
| Biochemical oxygen demand BOD mg/L | 3790 | 650 | 160 (average 120 days) |
| Chemical oxygen demand COD mg/L | 1760 | 97.5 | 160 (average 120 days) |
| Ammoniacal-nitrogen $NH_4$—N mg/L | 955 | 321 | 0.4 was multiplied by the ammoniacal-nitrogen per L, total of 100 mg for the nitrite nitrogen and the nitrate nitrogen |
| Nitrite nitrogen $NO_2$—N mg/L | 0.017 | <0.001 | |
| Nitrate nitrogen $NO_3$—N mg/L | <0.02 | <0.02 | |
| Total nitrogen T-N mg/L | 1050 | 329 | 120 (average 60 days) |
| Total phosphorous T-P mg/L | 126 | 0.271 | 16 (average 8 days) |
| Suspended substances SS mg/L | 4500 | 22 | 200 (average 150 days) |

TABLE 5

Analysis Method
No. 2003-00535-A01

| Item | Analysis method |
|---|---|
| Hydrogen ion concentration | JIS K 0102 12.1 Glass electrode method |
| Biochemical oxygen demand | JIS K 0102 21., JIS K 0102 32.3 Diaphragm electrode method |
| Chemical oxygen demand | JIS K 0102 17 Oxygen consumption by potassium permanganate at 100° C. |
| Ammoniacal-nitrogen | JIS K 0102 42.1 Indophenol blue absorptiometry |
| Nitrite nitrogen | JIS K 0102 43.1 Naphthylethylene diamine absorptiometry |
| Nitrate nitrogen | JIS K 0102 43.2 Copper, cadmium column reduction, and naphthyl diamine absorptiometry |

TABLE 5-continued

| | Analysis Method No. 2003-00535-A01 |
|---|---|
| Item | Analysis method |
| Total nitrogen | JIS K 0102 45.4 Copper, cadmium column reduction method |
| Total phosphorous | JIS K 0102 46.3-1 Potassium peroxydisulfate decomposition method |
| Suspended substances | Method listed in Attached Table 2 of 1971 Notification No. 59 of the Environment Agency |

Table 4 shows the flocculation experiment results using livestock drainage water (untreated) as the organic suspension. 1 L of the untreated livestock drainage water shown in Table 4 was agitated for 1 minute while adding 1 ml of the flocculant manufactured with the above-mentioned Example of Embodiment 1, and this was allowed to rest for 30 minutes. The supernatant was sampled as the water to be treated. The source water and the treatment water were measured at the Okinawa Environmental Research & Technology Center, and the 9 items were measured using the analysis methods shown in Table 5, and the results were compared.

For the suspended substances in the measurement items, 4500 mg/L were present in the source water; this decreased dramatically to 22 mg/L after treatment, achieving the waste water standard in one treatment. In the experiment, the severe condition of using livestock drainage water as the organic suspension was used, so the drainage water standard was not achieved for some of the items, but the drainage standards can be achieved by repeating water treatment with the present flocculant, as well as through combination with another flocculation as a flocculation initiation agent in pre-treatment.

INDUSTRIAL APPLICABILITY

The flocculant according to the present invention has a construction made from a silicon colloidal solution gelated through dilution and thereby flocculating suspended matter, making it possible for the silicon colloidal solution to encapsulate suspended matter in the suspension, gelate and flocculate when a flocculant is inserted in a suspension of service water, drainage water, or the like to dilute the flocculant, so the flocculant according to the present invention has the effect that a suspension of tap water treatment plant, sewage treatment plant, industrial drainage water or other service water or drainage water can be easily, safely, and quickly treated.

The objects of treatment include tap water plants (simple facilities as well as emergency water supply facilities for times of disaster); sewage and waste water treatment plants; compost drainage water treatment facilities; park and golf course ponds (agricultural use feed ponds); dam and other summertime blue-green algae countermeasures; aquaculture plant drainage water; home pollution countermeasures; hog breeding and chicken breeding livestock drainage water; slaughterhouse meat processing facility drainage water; aquatic product processing plant drainage water; meal provisioning-related rice cooking centers; dairy product processing plants; bread and noodle manufacturing plants; hotel, restaurant, and other large dining facilities; brewery drainage water; tofu manufacturers; large dry cleaning plants; hospital drainage water; resort region environmental maintenance facilities; dyeing plant drainage water; paper manufacturing plant drainage water; pool and bath water recycling; miso, soy sauce, and beer manufacturing drainage water; and the like.

The present invention also has the effect that the flocculant mentioned in claim 1 has a construction where the above-mentioned silicon colloidal solution is dissolved in a silicon-containing substance provided with acid solubility by mixing a silicon-containing substance with an alkaline substance and heat treating the result at a temperature below the melting temperature of the silicon-containing substance in an acid solvent, so the silicon-containing substance is provided with acid solubility, and a stable silicon colloidal solution is produced by the easy action of melting the silicon-containing substance in an acid solvent.

Also, the present invention has the effect that for the flocculant, the above-mentioned alkaline substance has a construction made from calcium carbonate or lime, so the silicon-containing substance is formed into a powder, increasing the solubility in acid solvents.

Also, with the flocculants of the present invention, the solubility of silicon is fixed with respect to the hydrochloric acid concentration because the above-mentioned acid solvent has a construction made from diluted hydrochloric acid, so the hydrochloric acid concentration in the acid solvent lowers, making the solution density dispersed in the solution sparse, and the silicon colloidal solution has a stable density with fixed water gaps, so a stable solution state can be maintained. Also, the hydrochloric acid has a high solubility in calcium, becoming calcium chloride ($CaCl_2$) when neutralized, so the present invention has the effect of producing a flocculant that is safe and non-toxic.

Also, the present invention has the effect that for the flocculants, the above-mentioned acid solvent has a construction containing one, two, or more gelation suppressants selected from an acetic acid, ammonium acetate, and ammonium chloride group, so gelation of the silicon colloidal solution can be suppressed by the gelation suppressant, maintaining a stable solution state for a long time.

Also the present invention has the effect that for the flocculants, the above-mentioned silicon-containing substance has a construction containing iron or aluminum, so the iron or aluminum melts along with the silicon in the acid solvent, and particulates/pigment particles that cannot be captured by ordinary flocculants are taken into the gel by the iron or aluminum reduction effect when the flocculant is used, causing flocculation and aggregation.

Also, with the flocculants of the present invention, the construction has a pH value of 2 to 3, so it is possible to maintain the silicon colloidal solution in a solution state when the pH index is 3 or below, and the pH adjustment can be made unnecessary or reduced when treating an acidic suspension by making the pH index 2 or higher. Accordingly, the present invention has the effect that a more acidic suspension can be treated by preferably making the pH near 3.

Also, the manufacturing method of the flocculant according to the present invention has a construction made from a silicon-containing substance generation means for mixing a silicon-containing substance and an alkaline substance, and heat treating the result at a temperature below the melting temperature of the silicon-containing substance to produce an acid soluble silicon-containing substance; an acid solvent generation means for generating a solvent from an acid solution; and a silicon colloidal solution generation means for dissolving the above-mentioned silicon-containing substance in the above-mentioned acid solvent to generate a silicon colloidal solution, so by providing the silicon-containing substance with acid solubility, a sable silicon colloidal solution can be generated by the easy action of dissolving the silicon-containing substance in the acid solvent. The present invention also has the effect that a suspension can be easily and safely treated because the silicon colloidal solution encapsulates suspended matter in the suspension, gelates and flocculates when the flocculant is added to a service water, drainage water, or other suspension, diluting it.

Also, the present invention has the effect that for the manufacturing of the flocculant, the above-mentioned alkaline substance has a construction made from calcium carbonate or lime, so the silicon-containing substance is formed into a powder, increasing the solubility in acid solvents.

Also, with the manufacturing methods of the flocculant of the present invention, the solubility of silicon is fixed with respect to the hydrochloric acid concentration because the above-mentioned acid solvent generation means has a construction made from a means to dilute hydrochloric acid to generate an acid solvent, so the hydrochloric acid concentration in the acid solvent lowers, making the solution density dispersed in the solution sparse, and the silicon colloidal solution has a stable density with fixed water gaps, so a stable solution state can be maintained. Also, the hydrochloric acid has a high solubility in calcium, becoming calcium chloride ($CaCl_2$) when neutralized, so the present invention has the effect of producing a flocculant that is safe and non-toxic.

Also, the present invention has the effect that in the manufacturing method of a flocculant, the above-mentioned acid solvent generation means has a construction including means for mixing 1, 2, or more gelation suppressants selected from an acetic acid, ammonium acetate, and ammonium chloride group with the above-mentioned acid solution, so gelation of silicon colloidal solution is suppressed by the gelation suppressant, and a solution state can be maintained for a long time.

Also, the present invention has the effect that in the manufacturing method of a flocculant, the manufacturing method has a construction with the addition of a filter means to filter the above-mentioned silicon colloidal solution to remove undissolved suspended matter, so undissolved suspended matter in the silicon colloidal solution is removed, and a silicon colloidal solution acidic saturated solution is generated.

Also, the present invention has the effect that in the manufacturing method of a flocculant, the manufacturing method has a construction with the addition of an aggregating means to add gypsum to the above-mentioned silicon colloidal solution to cause aggregation of the undissolved suspended matter, so undissolved particulates causing clogging of the filter are captured by the solidification capacity of they gypsum and caused to aggregate, creating a gap for water passage and increasing the filtration.

Also, the present invention has the effect that in the manufacturing method of a flocculant, the manufacturing method has a construction with the addition of a pH value adjustment means to add iron or aluminum to the above-mentioned silicon colloidal solution and adjust the pH value of the silicon colloidal solution, iron or aluminum for capturing color pigment and particulates in a gel with a reduction effect adjust the pH value, and a more acidic suspension can be treated by adjusting the pH index by which the silicon colloidal solution can be maintained in a solution state to 3 or lower, and preferably adjusting it to near 3.

Also, the flocculation method of the present invention has a construction for mixing a harmless flocculant made from silicon with a suspension to flocculate the suspended matter, so there is the effect that the flocculant can be mixed in a suspension of tap water treatment plant, sewage treatment plant, industrial drainage water or other service water or drainage water, and the suspended matter in the suspension is encapsulated and quickly flocculated, so a suspension can be treated easily and safely at any location.

Also, the flocculation method according to the present invention has a construction made with the addition of a means to further mix an alkaline substance in the suspension, so the silicon colloidal solution is neutralized even when the acidity of the suspension is strong, and flocculation of the suspended matter occurs along with gelation of the silicon colloidal solution. There is also the effect that by using a power such as calcium carbonate or lime as the alkaline substance, that powder can be used as the core to flocculate to cause quick precipitation in a short time in cases of low concentrated suspensions that require time with a small flocculant, and cases of suspensions with organic matter requiring time and with a light flocculate.

The present invention provides a flocculant that can maintain a silicon colloidal solution state for a fixed period (a year or longer) with a fixed acidity (pH near 3), and that uses characteristics of gelation change in a silicon colloidal solution when the stable balance of the solution state is lost due to dilution when using the flocculant to cause suspended particulates in water to be encapsulated in a gel and converge, thereby flocculating and separating the particulates from the water.

The invention claimed is:

1. A liquid flocculant for flocculating suspended matter, wherein the floculant is obtained by:
   mixing a silicon-containing substance with an alkaline substance that is calcium carbonate or lime, heating the resulting mixture at a temperature below the melting point of the silicon-containing substance, whereby the silicon-containing substance is rendered acid soluble, and
   dissolving the so-heat-treated silicon-containing substance in acid solvent that includes HCl and at least one or more of acetic acid, ammonium acetate, and ammonium chloride to obtain the liquid flocculant.

2. The flocculant of claim 1, wherein said silicon-containing substance contains iron or aluminum.

3. The flocculant of claim 1, having a pH value of 2 to 3.

4. A manufacturing method for a flocculant made from a liquid silicon calcium containing substance comprising the steps of:
   combining a silicon-containing substance and an alkaline substance that is calcium carbonate or lime;
   heat treating the resulting combination at a temperature lower than the melting temperature of said silicon-containing substance to generate an acid soluble silicon-containing substance;
   combining the acid soluble silicon-containing substance with an acidic solvent that includes HCl and one or more of acetic acid, ammonium chloride, or ammonium acetate to obtain an acid silicon calcium colloidal solution that is a liquid flocculant.

5. The manufacturing method for the flocculant of claim 4, further comprising the step of passing the acid silicon calcium colloidal solution through a filter for filtering said silicon calcium colloidal solution to remove undissolved suspended matter.

6. The manufacturing method for a flocculant of claim 4, wherein an aggregating means is added for adding gypsum to said acid silicon calcium colloidal solution to cause undissolved suspended matter to aggregate.

7. The manufacturing method for a flocculant of claim 4, wherein a pH adjustment means is added to add iron or aluminum to said acid silicon calcium colloidal solution to adjust the pH value of said acid silicon calcium colloidal.

8. A flocculation method for mixing the flocculant mentioned in claim 3 with a suspension to flocculate suspended matter.

* * * * *